United States Patent [19]

Li

[11] Patent Number: 4,762,592

[45] Date of Patent: Aug. 9, 1988

[54] ORBITAL DRIVE EVAPORATOR

[76] Inventor: Yao T. Li, Huckleberry Hill, Lincoln, Mass. 01773

[21] Appl. No.: 921,142

[22] Filed: Oct. 20, 1986

Related U.S. Application Data

[63] Continuation-in-part of Ser. No. 598,473, Apr. 9, 1984, which is a continuation-in-part of Ser. No. 367,251, Apr. 7, 1982, Pat. No. 4,441,963, which is a continuation of Ser. No. 201,380, Oct. 27, 1980, abandoned, which is a continuation-in-part of Ser. No. 961,452, Nov. 16, 1978, Pat. No. 4,230,529.

[51] Int. Cl.$^4$ ............ B01D 3/02; B01D 1/22; B01D 1/28
[52] U.S. Cl. .................. 202/172; 202/175; 202/176; 202/236; 202/237; 202/265; 202/266; 159/6.2; 159/24.1; 159/25.2; 159/27.1; 159/43.1; 159/900; 203/11; 203/26; 203/DIG. 24
[58] Field of Search ............ 159/6.1, 6.2, 11.2, 159/13.2, 12, 7, 3, 13.1, 900, 901, 11.1, 24.2, 24.3, 24.1, 25.1, 25.2, 27.1, 17.1, 43.1; 202/236, 237, 238, 175, 172–174, 176, 266, 265; 203/26, 72, 89, 10, 11, DIG. 4, DIG. 24, 90, DIG. 17

[56] References Cited

U.S. PATENT DOCUMENTS

| | | | |
|---|---|---|---|
| 2,575,690 | 11/1951 | Smith | 202/238 |
| 2,884,050 | 4/1959 | Brownell | 159/6.1 |
| 2,894,879 | 7/1959 | Hickman | 20.3/27 |
| 3,190,817 | 6/1965 | Neugebauer et al. | 202/236 |
| 3,265,115 | 8/1966 | Maier | 159/13.4 |
| 3,271,272 | 9/1966 | Watt | 202/236 |
| 3,511,843 | 5/1970 | Lewis | 202/175 |
| 4,226,669 | 10/1980 | Vilardi | 159/6.1 |
| 4,230,529 | 10/1980 | Li | 202/175 |
| 4,249,989 | 10/1981 | Kalmykov et al. | 159/10 |
| 4,441,963 | 4/1984 | Li | 202/172 |
| 4,504,361 | 3/1985 | Tkac et al. | 202/236 |
| 4,586,985 | 5/1986 | Ciocca et al. | 202/236 |
| 4,618,399 | 10/1986 | Li | 159/6.2 |

Primary Examiner—Wilbur Bascomb
Attorney, Agent, or Firm—Wolf, Greenfield & Sacks

[57] ABSTRACT

A wobbling-type evaporator mounts a container 1 holding at least one vertically oriented heat transfer tube 30 fed by a liquid inlet 35 to the container 1. The container 1 is supported with respect to a base 10 so that it wobbles in response to the rotation of an orbiting counterweight 2,2' the counterweight and container wobble as a two body system about common axis. In one form a set of struts 6 located around the container are part of the support system. The invention also includes inlet water distribution systems, compatible with this orbital drive.

14 Claims, 6 Drawing Sheets

ORBITAL DRIVE EVAPORATOR

REFERENCE TO RELATED APPLICATIONS

This application is a continuation-in-part of U.S. Ser. No. 598,473, filed Apr. 9, 1984, which is a continuation-in-part of U.S. Ser. No. 367,251, filed Apr. 7, 1982, now U.S. Pat. No. 4,441,963, which is a continuation of U.S. Ser. No. 201,380, filed Oct. 27, 1980, now abandoned, which in turn is a continuation-in-part of U.S. Ser. No. 961,452, filed Nov. 16, 1978, now U.S. Pat. No. 4,230,529.

BACKGROUND OF THE INVENTION

This invention relates in general to evaporation and distillation apparatus of the wobbling-type described in U.S. Pat. Nos. 4,230,529 and 4,441,963, and to the improved evaporator using a whip rod in each heat transfer tube as described in applicant's parent application U.S. Ser. No. 598,473 (U.S. Pat. No. 4,618,399). More specifically, it relates to an orbital drive and suspension system and liquid feed arrangements compatible with this drive system.

The wobbling type of evaporator, as discussed in the aforementioned U.S. patents, has the advantages of a high heat transfer coefficient and a low power requirements for operation. However, in many chemical engineering applications, capital and maintenance cost of the equipment are crucial to the user. The cranks, bearings, and complicated seals employed inside the evaporator as described in applicant's earlier U.S. Pat. No. 4,441,963 has been found to be impractical in the chemical industry where most of the working medium are either corrosive or sensitive to contamination.

In addition, it has been found to be difficult and costly to manufacture and assemble the drive arrangements disclosed in these U.S. patents. They all involve a common drive shaft, bearings and eccentrics to develop the characteristic wobbling motion of the tube or tubes with respect to a support structure for the tubes. To have a good dynamic balance during operation, these drive parts must be machined to close tolerances, with attendant increases in cost. Assembly is also critical, and more costly, since there are a large number of components which must be assembled in a precisely defined manner in order to avoid misalignments that will produce a dynamic imbalance. Wear of the moving components also can introduce a deterioration in the balance of the wobbling tubes and the performance of the evaporator.

The present invention overcomes these problems by simplifying the construction, and thereby increasing the reliability, while reducing the capital cost. Specifically, a novel orbital drive and suspension system replaces the positive displacement drive, such as cranks or eccentrics, which were used previously to generate the wobbling motion.

It is therefore a principal object of this invention to provide a wobbling tube type evaporator that provides a good dynamic balance free from residual vibratory forces and moments.

Another object is to provide an evaporator with the foregoing advantages that also has a simplified construction, and a reduced cost of manufacture.

Yet another object is to provide an evaporator with the foregoing advantages that is reliable and offers low maintenance costs.

Another object is to provide an evaporator with the foregoing advantage which avoids any positive eccentric-mechanical drive and in certain embodiments is automatically self balancing with changes in the mass of the evaporator and fluids being processed.

Yet another object is to provide an evaporator with an improved fluid distribution that reduces entrainment, has a low cost of manufacture, and is compatible with the drive system of the present invention.

Still another object is to provide an evaporator with the foregoing advantages that adapts for operation with a whip rod fluid distributor mounted from either above or below the wobble tube or tubes.

SUMMARY OF THE INVENTION

One or more tubes are supported vertically in a container. A liquid to be evaporated is introduced to the tubes at their upper inside surfaces. The container is driven to revolve in a wobbling motion which distributes the liquid in a thin film over the interior surface of the tube. Some vapor stream is directed to the exterior surface of the tubes where it condenses to form the distillate. The heat given up by the condensing vapor is used to produce the evaporation at the opposite tube surface.

The container is supported at a horizontal bracket plane by a set of struts coupled at an upper end to the bracket plane fixed to the container and at a lower end to a base. The couplings are rigid to applied torsional forces or forces directed along the vertical axis of the container. However, they have a low resistance to lateral forces.

Rotation of a counterweight system about a vertical axis, in combination with the suspension described above, developes the wobbling motion of the container, and the tubes fixed in the container, about a second vertical axis. The centers of gravity of the counterweights and the evaporator orbit this second axis. In a preferred embodiment, there are two counterweights each supported on a radially extending arm that rotates about or with a shaft mounted on the container. The arm length and vertical position of the arms on their respective shafts are adjustable.

The evaporator includes a fluid distribution system compatible with this drive and suspension system. In one form the fluid distribution system includes a liquid feed tube that extends into each wobble tube and has an exit port configured and oriented to produce a tangential stream directly onto the interior surface of the wobble tube with a minimum of splashing. In an alternate form the fluid is distributed by a pair of tube sheets that define a liquid feed chamber about the wobble tubes and one or more opening formed directly in the upper end of the wobble tube to direct the liquid from the chamber to the interior of the tube. With either form, a whip rod is preferably used to spread the liquid into a thin film of generally uniform thickness. For the alternative form of fluid distribution system, the whip rod can be suspended from above using a flexible connector. Preferably a weight is located on the flexible connector to throw the whip rod against the tube despite the weight of the rod.

The evaporator may include a ring secured on the base and a peg secured on the bottom of the canister to limit the excursion of the container when it abuts the ring. Energy absorbing material coupled between the container and the ring provides damping. In another embodiment, adapted for shipboard use, one or both counterweights are limited to a fixed wobbling radius by coupling the counterweight shaft or shafts to a fixed base.

These and further features and objects of the present invention will become apparent to those skilled in the art from the following detailed description, which should be read in light of the accompanying drawings.

DETAILED DESCRIPTION OF THE PREFERRED EMBODIMENTS

Figure 1:
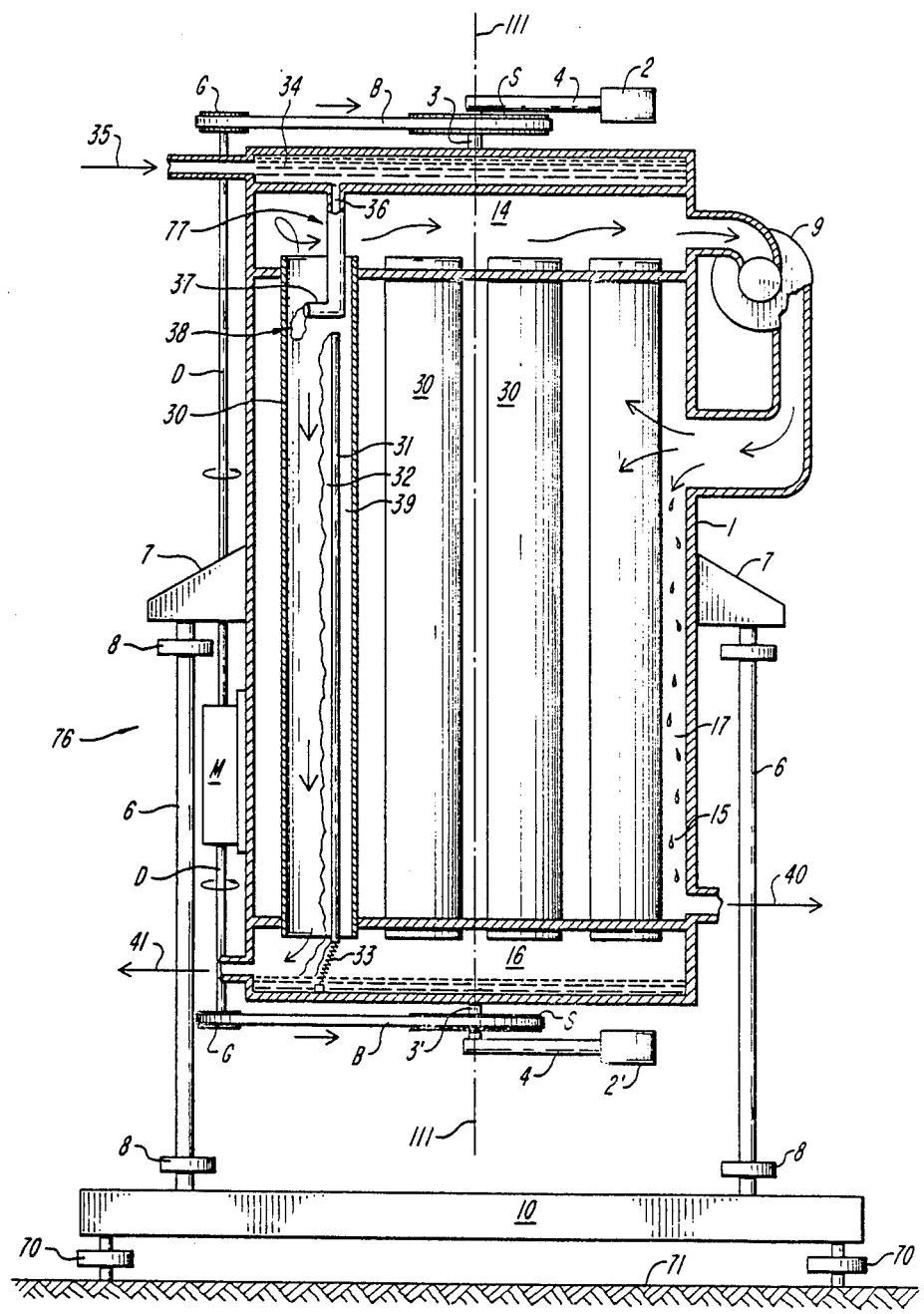
FIG. 1 is a cross-sectional view, and partially is side elevation, of an orbital drive evaporator according to the present invention configured in a vapor compression mode of operation.

FIG. 1 shows an evaporation and distillation apparatus 1 used, for example, as a vapor compression mode of operation, but not limited to this particular mode, utilizing an orbital drive suspension system 76 together with fixed feed liquid nozzles 77. In this distillation system the entire unit is supported by multiple (four, as shown) struts 6 attached to brackets 7 secured to the outside of the main evaporation housing 1 and lying in a generally horizontal plane perpendicular to a central vertical axis 111 of the system. For convenience, the set of co-planar brackets 7 will be referred to herein as the "bracket plane". Also, for convenience, the invention will be described with reference to a distillation apparatus for salt water The evaporator 1 has four main sections. A top chamber 34 is the feed water manifold. Below that is a vapor collecting chamber 14. Then comes a condensing chamber 17 which contains a group of heat transfer tubes 30. At the bottom is a residue chamber 16. Feed liquid is introduced at inlet 35 into the feed liquid manifold 34. Distribution tubes 36 each distribute the feed liquid to an associated heat transfer tube 30. The feed water exits each tube 36 from a nozzle 37 as a tangential jet 38.

The design and operation of the tubes 30 is described in detail in the aforementioned U.S. Pat. Nos. 4,230,529 and 4,441,963, the disclosures of which are incorporated herein by reference. In general, the feed liquid is swirled around the tubes to spread it into a thin film over the interior surface of the tubes 30 to provide an efficient heat transfer via the tube wall. The wobbling motion of the tubes produces an effect similar to swirling a small volume of tea around in a cup revolving in a circular path without rotation about its own axis.

A whip rod 31 anchored by a flexible coupling 33 is placed inside each heat transfer tube 30. The whip rod extends generally vertically within the tube from a point below the nozzles. The whip rod is driven by the wobbling motion of the evaporators to revolve, but not rotate, about its own axis, inside the associated heat transfer tube 30. In so doing it will wipe the feed liquid down in front of the whip rod in the form of flow stream 32 while it leaves a thin film 39 behind the whip rod. The whip rod functions in the same manner as the whip rod disclosed in the aforementioned U.S. Pat. No. 4,618,399.

Evaporation that takes place inside the heat transfer tube 30 will produce vapor that flows upwardly into the chamber 14. A compressor 9 compresses this vapor and moves it into the chamber 17 where it condenses on the outside of the heat transfer tubes 30 to form a condensate or distillate 15 which flows out from exit 40. Since the whip rod is driven under dynamic action, there are no seals or mechanically driven gear trains. Furthermore, since the whip rod is moving over a liquid film there is ordinarily substantially no wear to the mating surfaces of the whip rod and heat transfer tubes. Thus, this evaporator has the inherent reliability of a traditional vertical tube evaporator while enjoying the advantage of a wipe film evaporator with a high heat transfer configuration.

As is evident from the construction, the wobbling motion of the evaporator is developed by a pair of counterweights 2 and 2', while the evaporator is supported by struts 6 that extend between the bracket plane 7 and the base 10, coupled at each end with a laterally yieldable coupling 8. This drive is structurally simple and all of the components are located outside the evaporator so that they are readily accessible for maintenance. Also, because of the simplicity of their construction, the added capital cost of this drive and suspension system is quite insignificant in ratio to the cost of the evaporator. Furthermore, this added cost may be offset by the saving of certain accessories such as a demister. The other advantages of the system are then a pure gain. The dynamic behavior of this drive system will be discussed below.

Figure 2:
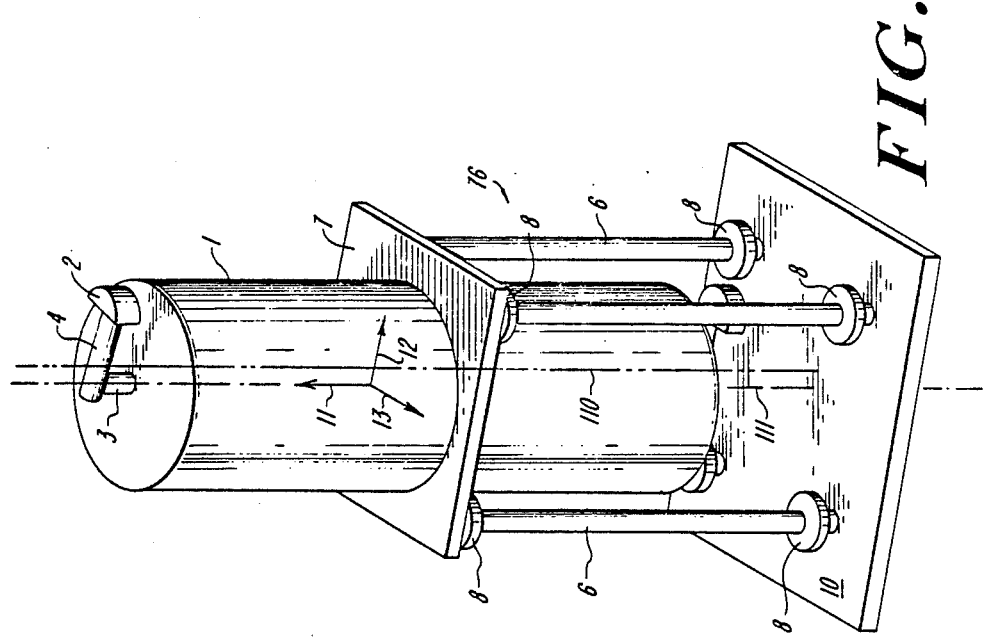
FIG. 2 is a simplified perspective view corresponding to FIG. 1.

The yieldable couplings 8 give the bracket plane 7 a two degree of freedom of planar movement with low elastic restraint with respect to the base 10, while at the same time maintaining high torsional rigidity in axis 11 (roll) as shown in FIG. 2 with respect to the base 10. The roll mode should have a natural frequency greater than the wobbling frequency. The lateral motion of the evaporator as well as its yaw and pitch modes (12 and 13) should have natural frequencies lower than the wobbling frequency to isolate the effect of residual imbalances from the base.

As shown in FIG. 1, a conventional electric motor M mounted on the exterior of the container drives the pair of orbital drive counter weights 2 and 2' to revolve in unison through a drive shaft D, gears G,G, and timing belts B which each engage a sprocket S on the shafts 3,3'. Alternatively, the motor M may be mounted on the ground and transmitting power to the drive shaft D through a double universal joint to isolate the motor from the wobbling evaporator. The combined center of gravity (C.G.) of the two counter weights is placed close to the plane containing the C.G. of the evaporator system. Thus, in operation both the C.G. of the evaporator system and the C.G. of the counter weights will orbit along circles centering around the orbiting axis 110 as shown in FIG. 2. so that their centrifugal forces will act in opposite directions to balance against each other as a two-body orbiting system each as the moon and the earth.

Ideally, if the lateral elastic restraint of the supporting struts is very small in comparison with the centrifugal forces, then the two centrifugal forces should balance with each other closely such as:

$$r W = (R-r) w$$

where
W = Weight of the evaporator
w = Weight of the counter weight
r = Radius of wobbling motion
R = Radius of the arm of the orbiting counter weight
R-r = Radius of the orbital motion of the counter weight This follows that $$r = w(R-r)/W$$

which shows that the wobbling radius is a simple function of the weight of the evaporator and may change to maintain a dynamic balance automatically. This is an advantage over the fixed value of "r" as in the case of a crank or an eccentric cam described in the aforementioned earlier patents where a change in the value of W (associated, for example, with variations in the liquid feed rate) causes dynamic imbalance.

Figure 3:
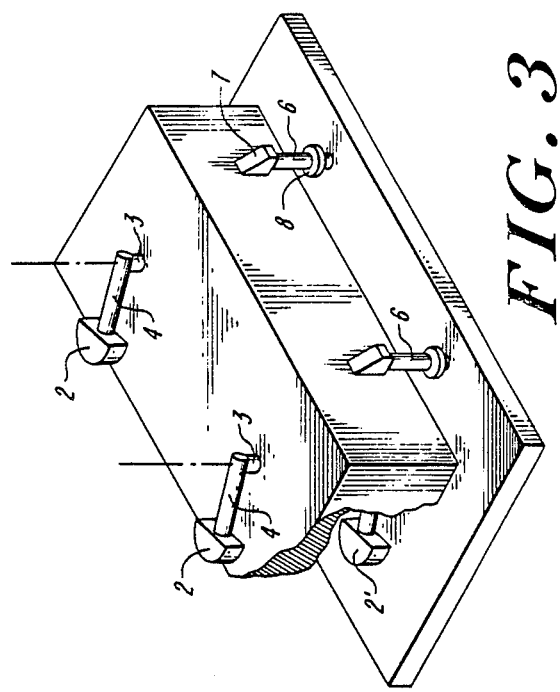
FIG. 3 is a perspective view of an alternative orbital drive evaporator according to the invention utilizing multiple containers and multiple orbital drives arrayed side by side.

For a typical small evaporator with a diameter of 10 inches, a height of 60 inches, a weight of about 100 lbs., and with a wobbling radius "r" in the range of ⅜ of an inch, the present invention requires two 4 lb. weights at the end of 5 inch arms. For a larger system or for composite systems with the height comparable with the width and the length as shown in FIG. 3, then the ratio of the counter weight to the evaporator weight would be considerably smaller than the 4% ratio given in the above example because in the later example some proportionally longer arms can be used.

Figure 4:
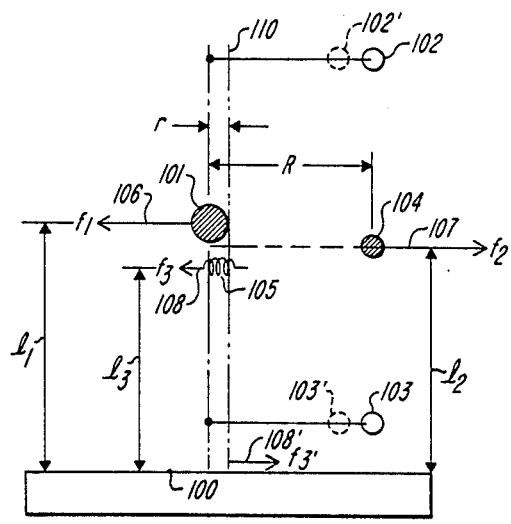
FIG. 4 is a force analysis diagram corresponding to the evaporator shown in FIGS. 1 and 2.

FIG. 4 shows a simplified force diagram of the various components of the orbital drive and suspension system described above where 100 represents the base line, 111 represents the center line of the evaporator with the center of gravity represented by the heavy dot 101. 102 and 103 represent the two counter weights. The combined effect of counter weights 102 and 103 is represented by a small dot 104 with an arm length of "R". Vertical line 110 represents the center line of the wobbling motion of the evaporator as well as the orbital motion of the counter weights, with the wobbling radius represented by "r" and the effective arm of the combined mass center of the counter weights represented by "R−r". Spring symbol 105 represents the elastic restraining effect on the motion of the evaporator in bracket plane produced by the struts. The centrifugal force of the wobbling evaporator is represented by the arrow 106 with a magnitude of $f_1$ acting at a height of $l_1$. The centrifugal force of the combined counter weight 104 is represented by the arrow 107 with a magnitude of $f_2$ acting at level $l_2$ above the base line. Arrow 108 represents the restraining force of the struts and couplings with a magnitude of $f_3$ acting at level $l_3$. 102' represents an adjustment of the position of 102, likewise 103' represents an adjustment of the counter weight 103. The combination of the adjustment of 102' and 103' will change both R and $l_2$, which in turn may accomplish the steady state stability conditions of:

$$\Sigma F = 0, \text{ and } \Sigma M = 0,$$

where F are the forces and M are the moments. $\Sigma F = 0$ may be satisfied by adjusting $f_1$ equal to $f_2$ with variation of R (since $f_3$ and $f'_3$ (108') are self balanced). $\Sigma M = 0$ may be satisfied by the following condition:

$$f_1 l_1 - f_2 l_2 = f_3 l_3,$$

with the variation of $l_2$. These adjustments can be made quite simply, especially since the wobbling radius "r" usually does not require a tight tolerance.

For dynamic stability it is desirable to have the natural frequency in the lateral planar motion mode considerably lower than the desired wobbling frequency. As a typical example, the wobbling speed may be running between 200 and 600 rpm or above three cycles per second, for which the lateral mode natural frequency can be adjusted to a half Hertz.

Utilizing the well known dynamic equation for a second order oscillator system such as $$K = \omega_n^2 W/(g)$$

where
K = the spring constant of the elastic restraint
$\omega_n$ = natural frequency
W = the weight of the evaporator
g = the gravitational constant.
Furthermore, since $$f_3 = K r,$$

and letting $$\omega_n = \pi,$$

(corresponding to ½ Hertz) and r = ⅓ we can compute $$f_3 = 0.0085 W,$$

or less than 1% of the weight of the evaporator. Similar to the need of a low natural frequency in the lateral motion, the natural frequencies in the pitch and yaw modes of the structure as defined in FIG. 2 must also be considerably lower than that of the wobbling frequency in order to tolerate any residue imbalance between the top and the bottom counterweights.

Figure 5:
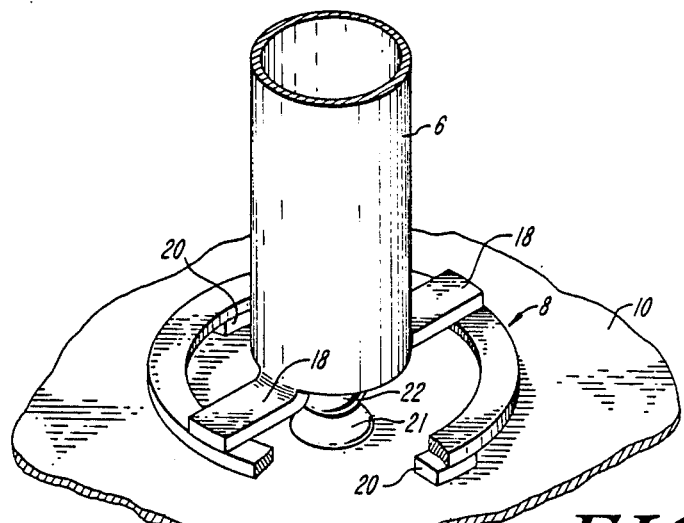
FIG. 5 is a view in perspective with portions broken away of a coupling between a strut and a base.

To accomplish the above objectives, the couplings used to attach the struts to the base and the mounting brackets should have low bending stiffness and a high torsional or axial rigidity. A known coupling that can accomplish this objective is shown in FIG. 5 securing a strut 6 to the base 10 (of course, it can equally well secure the strut to a bracket 7). An elastic coupling ring 8 is attached to the base by two mounting pads 20 and to the strut 6 at two lugs 18, disposed orthogonal with the center line of mounting pads 20. In a typical construction for a small evaporator, the ring 18 can be formed from berrylium copper, 35 mils thick, with an outside diameter of about 2 inches. This type of ring structure can give good bending flexibility while maintaining high torsional rigidity between the strut and the base. The rigidity in the axial mode of the strut can be further reinforced, if so desired, by the spherical point contact between bearings 21 and 22 attached to the base and to the strut, respectively.

Figure 6:
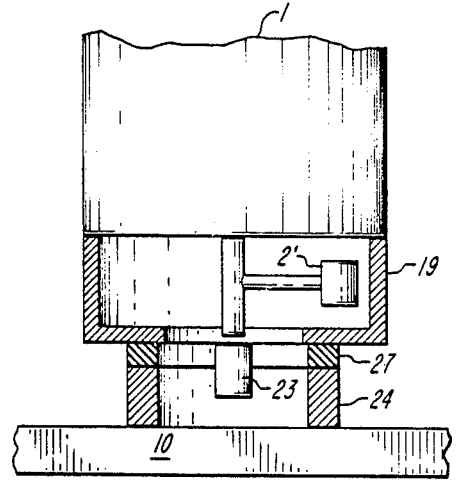
FIG. 6 is a simplified view in side elevation, and partially in cross ection, of an alternative embodiment of the evaporator shown in FIG. 1 with an arrangement to limit and damp the wobbling motion.

FIG. 6 illustrates an alternative embodiment to provide motion limit controls and damping for the orbital drive as shown in FIG. 1. A frame 19 (which can be used to carry a second, outer set of bearings for the counterweight 2) is added to the bottom of the main evaporator 1. The frame also carries a peg 23 which moves inside a ring 24 which is fixed on the base 10. In normal operation, peg 23 stays within the ring 24 without touching it. However, during start-up of the wobbling motion, the ring 24 limits the excursion of the peg 23. In operation after start-up, the peg 23 also prevents the wobbling motion from going beyond its designed limit due to some excessive imbalance. With this arrangement, an energy absorbing material 27 such as sponge rubber can be cemented between the frame 19 and the ring 24 to provide damping. The damping effect serves two functions. One is to prevent or limit the occurrence of overshoot of the wobbling motion during start-up. The second is to prevent the low frequency wandering of the mass center.

Figure 7:
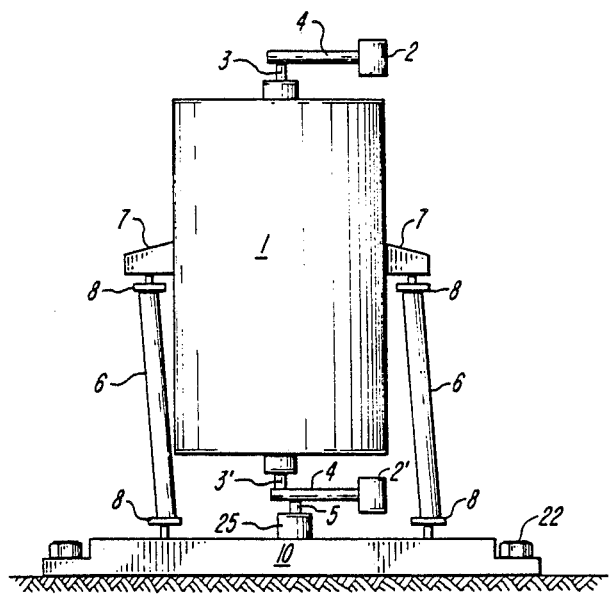
FIG. 7 is a simplified view in side elevation of an alternative embodiment for use on a moving vehicle where the base is anchored and the lower counterweight is driven at a fixed orbital radius.

An evaporator as shown in FIG. 1 with low lateral stiffness in the suspension system usually requires having the entire system properly leveled. This can be accomplished by the leveling screws 70 shown in FIG. 1. When the system is properly balanced and leveled it will sit on the "ground" 71, as shown in FIG. 1, without the use of anchoring bolts. (This reflects that with this drive system there is substantially no residual forces or moments which can cause the system to vibrate and move with respect to ground.) When the system is mounted on a moving base, such as in shipboard use, then it may be necessary to attach the base of the system to the floor with anchoring bolts 72 as shown in FIG. 7. In this situation, where the "ground" may be tilting, it may be necessary to modify the evaporator by adding a crank shaft 5 attached to the counter weight arm 4' at the bottom of the evaporator. This crank arm 5 will be engaged by a bearing 25 attached to the base 10. In this manner the wobbling radius "r" is precisely defined. As a result, the location of the counter weights 2 and 2' must be adjusted accordingly to minimize stresses to the structure.

Figure 8:
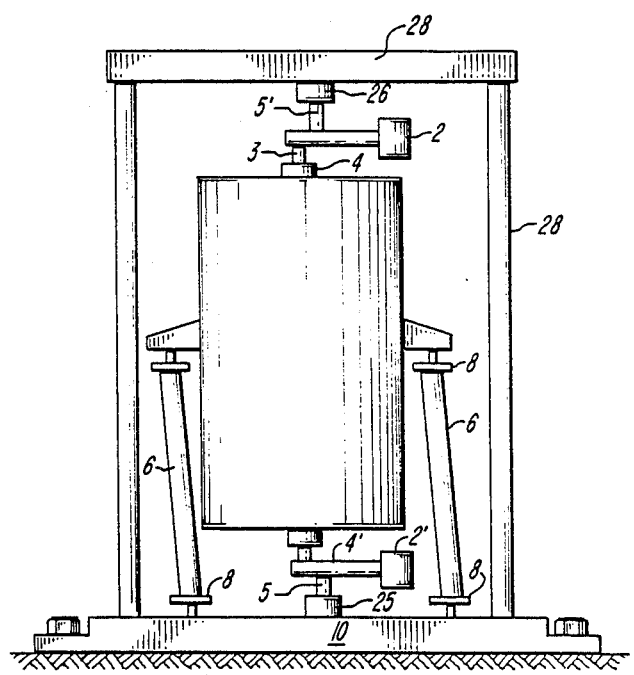
FIG. 8 is a simplified view in side elevation of an alternative embodiment of the evaporator shown in FIG. 7.

FIG. 8 is an alternative embodiment which accomplishes the same objective as the arrangement shown in FIG. 7, but with the introduction of a rigid frame 28 and the addition of crank 5' to the upper arm 4 and engaging with bearing 26 mounted on the top member of frame 28. It is to be noted that in the arrangement of FIG. 8 the rigidity provided by the frame 28 and the rigidity provided by the suspension system of struts 6, couplings 8, and brackets 7 presents a redundancy situation. To avoid undue structure stress, the torsional rigidity in the pitch and yaw modes of the supporting structure should be reduced so that the pitch and yaw resistance will be provided by the rigid frame 28.

Figure 9:
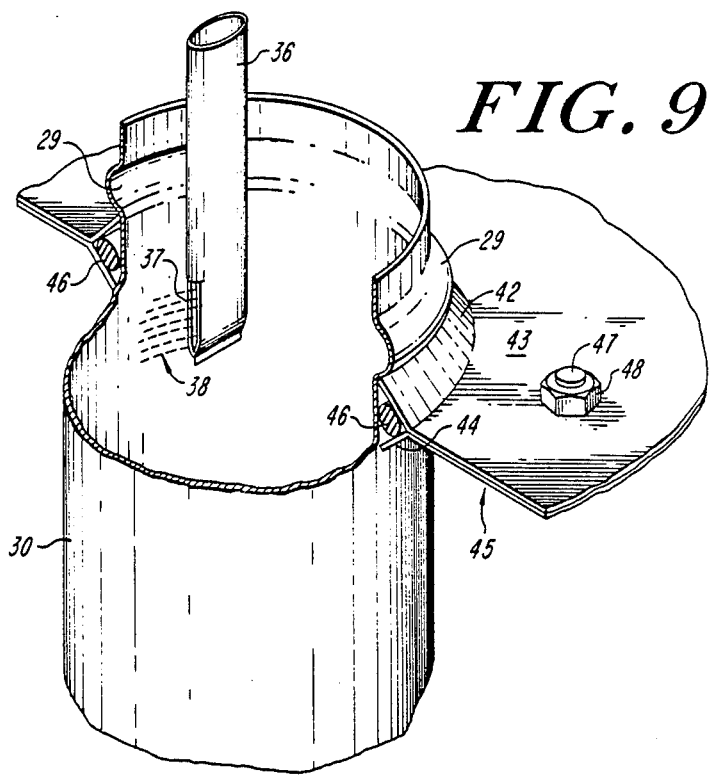
FIG. 9 is a detail view in perspective, with portions broken away, of a liquid distribution inlet for use with an orbital drive evaporator of the type shown in FIGS. 1-8.

FIG. 9 shows in detail the nozzle construction illustrated in FIG. 1. FIG. 9 also shows a novel design for mounting the transfer tubes 30 and providing a fluid barrier to define different zones within the evaporator, for example, separating the vapor collecting chamber 14 from the condensing chamber 17. The nozzle shown in FIG. 9 consists of a narrow slit 37 formed at the tip of tube 36. The slit is oriented and configured so that the outgoing jet 38 of feed water impinges upon the inside surface of the tube tangentially and is in contact with the tube almost immediately after leaving the nozzle. This is very crucial for a nozzle fixed with respect to the tube, as here, because while the tube is wobbling, every part of the tube will experience a revolving centrifugal force. As a result, droplets which are allowed to leave the nozzle unattached can travel in any direction and may, therefore, be carried away by the upward flowing vapor stream as entrainment. By letting the jet shoot out tangentially and close to the tube surface, it performs a necessary feature to keep the entrainment to a minimum and avoid the need for a demister.

As shown in FIG. 9, an outwardly bulged ring 29 is provided in the wall of the heat transfer tube 30 at its upper end. The bulged ring acts in cooperation with a pair of tube sheets 43, 45 which extend laterally across the evaporator and separate the chamber 14 from the chamber 17. The bulge ring serves two purposes. The first one is to prevent the tube from sliding down through a hole in the tube sheets 43 and 45 that receives the tube 30. It also serves as a collecting trough for the liquid which might otherwise escape upwardly from the tube 30. Each tube 30 is sealed to the tube sheets 43 and 45 with a "O" ring 46. This ring is squeezed tightly against the tube by a beveled flange 42 of the tube sheet 43 and a beveled flange 44 of the tube sheet 45 when these two sheets are clamped together by a number of studs 47 and nuts 48.

Figure 10:
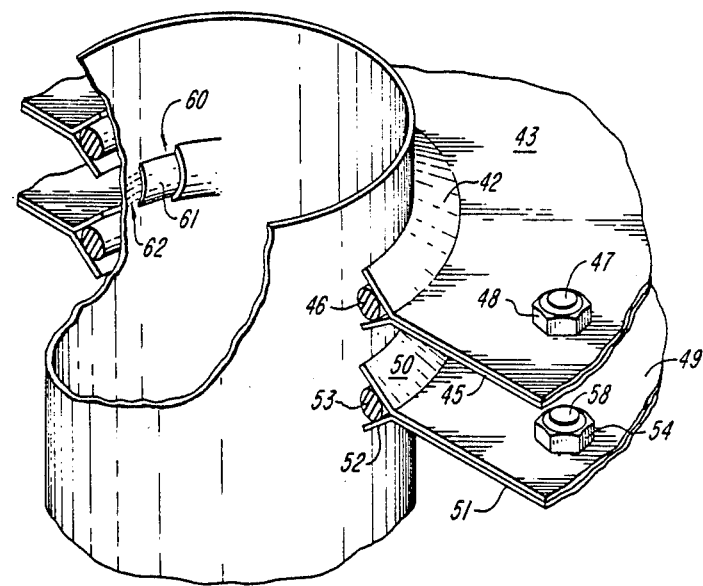
FIG. 10 is a detail view in perspective with portions broken away, of an alternative embodiment of a liquid distribution inlet for use in an orbital drive evaporator according to the present invention.

FIG. 10 shows an alternative arrangement for introducing feed liquid to the evaporator tube 30. In this configuration a nozzle is formed on the tube itself. A vertical slit 60 is sheared on the tube wall. A piece of rectangular sheet metal 61 is secured in the slit so that it, together with the opening of the slit, provides a well defined tangential nozzle from which the liquid jet 62 will emerge. The creation of a tangential jet in close proximity to the interior surface of the heat transfer tube 30 provides the same advantages as the nozzle 37 and jet 38 discussed above with reference to FIG. 9. For this kind of nozzle the liquid distribution manifold may be formed between two sets of sheets of tube sheets. Thus, in addition to the pair of tube sheets 43 and 45, a second set of 49 and 51 are provided, spaced vertically from the paired sheets 43, 45, as shown. The feed liquid will be introduced from a side wall of the tank in the same manner as feed liquid inlet 35 of FIG. 1, but not shown in FIG. 10. This novel arrangement of FIG. 10 is easier to assemble because the nozzle is an integral part of the heat exchanger tube. Furthermore, it is convenient to provide two or more nozzles on the same tube to improve the distribution at the upper end of the tube, as shown in FIG. 10.

Figure 11:
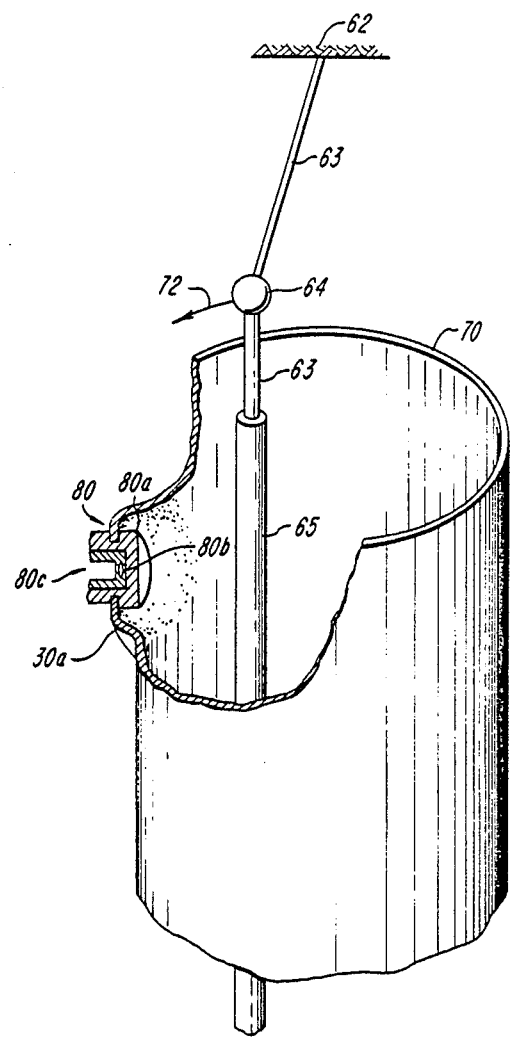
FIG. 11 is a simplified detail view, partially in cross section, and with portions broken away showing the liquid distribution inlet of FIG. 10 used in combination with a whip rod supported from a point above the associated wobble tube.

The liquid feed arrangement of FIG. 10 can also be formed by drilling holes in the tubes 30 and inserting molded nozzle members 80 which direct the fluid stream in the desired tangential jet onto the inner surface of the tube as shown in FIG. 11. In particular, FIG.

11 shows a preferred arrangement where the tube wall 30a surrounding the hole is bowed outwardly so that the portion 80a of the member 80 which projects into the tube and has an outlet passage 80b does not project beyond the inner surface of the tube. This is important to allow the whip rod to move freely over the inner tube surface without striking the nozzle member. The members 80 include an inlet 80c that is in fluid communication with the feed liquid manifold formed by the tube sheets 43, 45, 49 and 51. The member 80 can be formed of a polymer material such as that sold under the trade designation "Teflon".

Another advantage of the FIG. 10 type of water distribution system is to eliminate the liquid feed tube 36. It is then possible to introduce a whip rod hanging from above as shown in FIG. 11, rather than supported from below by a flexible connector anchored to the bottom of the container and acting as a double universal joint. In FIG. 11 the whip rod 65 is hung from an upper structure 62 (e.g. the top plate of the evaportor) by a flexible member 63 such as stainless steel cable. As described in U.S. Pat. No. 4,618,399, the whip rod itself is somewhat flexible to produce a generally uniform liquid film even though there may be variations in the smoothness or alignment of the interior surface of the transfer tube 30. The whip rod may itself be formed of a stainless steel cable, or, as shown, it may have a sheathing of a material such as silicon rubber. A weight 64 creates a centrifugal force 72 to balance the downward pulling of the weight of the whip rod 65. It is to be noted that this arrangement is in structure and operation quite different from the rigid hanging blade disclosed in my U.S. Pat. No. 4,441,963. The earlier rigid blade hung from a revolving arm. This arrangement introduces wear. Also, in a revolving arm, the blade must present one fixed edge scraping against the inside surface of the tube, which may be good for some applications, but could be bad for some other applications. The hanging arrangement shown in FIG. 11 involved no revolving arms. Furthermore, the whip rod 65 is fixed to the base 62 so that it will not rotate; it revolves to contact the tube 30 over its entire surface, nor merely one part of its surface.

There has been described an improved evaporator having a novel drive and suspension system that is reliable, has a low cost, and operates with an excellent dynamic balance. There has also been described a feed liquid distribution system that is compatible with this drive and substantially eliminates entrainment so that high distillate purity can be achieved without using a demister. In addition to the performance advantages noted above, this simplified distribution system and the avoidance of a demister offset the costs of the orbital drive system as compared to earlier wobbling tube systems.

While this invention has been described with respect to its preferred embodments, it will be understood that various modifications and variations will occur to those skilled in the art. Such modifications and variations are intended to fall within the scope of the appended claims.

What is claimed is:

1. In an evaporator having a container, a feed liquid inlet to the container, an outlet for condensate from the container, at least one vertically oriented heat transfer tube mounted within the container so that the feed liquid can evaporate at the interior surface of said heat transfer tube to form a vapor stream by taking heat from the vapor stream condensing at its exterior surface to form the condensate the improvement comprising an orbital drive and suspension system comprising
   A. a base,
   B. at least one orbiting counterweight,
   C. means coupled to said container for mounting said counterweight to rotate about a first vertical axis generally parallel to said heat transfer tube,
   D. means to rotate said counterweight and said counterweight mounting means,
   E. means for directing the feed liquid from said inlet to the interior of said heat transfer tube, and
   means mounted on said base for supporting said container to revolve in response to the rotation of said counterweight as an orbiting two-body system about a common second vertical orbiting axis for said container and said counterweight, said supporting means with said container mounted thereon having a low lateral stiffness in a plane orthogonal to said first and second vertical axes, and having high torsional rigidity, said container supporting means providing a dynamic balance for said evaporator during said rotation and said revolving.

2. The improved evaporator of claim 1 wherein said container supporting means comprises
   a plurality of rigid struts each extending generally vertically between said base and a horizontal plane through said container,
   strut mounting means secured at the exterior of said container at said horizontal plane, and
   coupled means for coupling said struts to said base and to said strut mounting means, said coupling means having said low stiffness to movement of said struts to accommodate a revolving-wobbling motion of said container generally within said horizontal plane.

3. The improved evaporator of claims 1 or 2 wherein said at least one counterweight comprises a pair of counterweights disposed above and below said container.

4. The improved evaporator of claim 3 wherein said counterweight supporting means comprise shaft means mounted on said container along said first axis and a pair of arms rotatably mounted on said shaft means and extending in a direction horizontal to said first axis.

5. The improved evaporator of claim 3 wherein the effective length of said arms is adjustable and wherein the vertical location of the combined center of gravity is adjustable.

6. The improved evaporator of claims 1 or 2 further comprising means for limiting the radius of the excursion of said container during said revolving.

7. The improved evaporator of claims 1 or 2 further comprising means for damping the motion of said container during said revolving.

8. The improved evaporator of claims 1 or 2 wherein said feed liquid directing means comprises,
   a feed liquid distribution manifold, and
   means for directing the feed liquid from the manifold to the heat transfer tube in at least oen stream that is generally tangential to the interior surface of the heat transfer tube and in sufficiently close physical proximity to the heat transfer tube that the centrifugal force of said revolving motion does not result in the entrainment of any significant portion of the feed liquid.

9. The improved evaporator of claim 8 wherein said feed liquid directing means includes a fixed conduit leading from said manifold to said heat transfer tube, said conduit having a nozzle at its end located within said heat transfer tube that is oriented and configured to produce said close, tangential stream.

10. The improved evaporator of claim 8 wherein said manifold is located around the upper end of said heat transfer tube, and wherein said feed liquid directing means includes an opening in said heat transfer tube wall to provide a flow path for the feed liquid to the interior of said heat transfer tube.

11. The improved evaporator of claim 10 wherein said feed liquid directing means includes a member located at said opening which directs liquid entering said hole into said tangential stream.

12. The improved evaporator of claim 10 further comprising a whip rod located inside each heat transfer tube with one end of the whip rod being anchored to the container such that the whip rod may revolve inside the heat transfer tube in response to the revolving motion of the container.

13. The improved evaporator of claim 11 wherein said hole is formed in an outwardly bowed portion of said heat transfer tube wall so that said member does not interfere with the movement of said whip rod over the inner surface of said heat transfer tube.

14. The improved evaporator of claim 1 further comprising a direct coupling between said base and said container to set a fixed radius of said revolving to accomodate movement of said base.

* * * * *